(12) United States Patent
Colli

(10) Patent No.: US 9,587,986 B2
(45) Date of Patent: Mar. 7, 2017

(54) APPARATUS FOR SENSING

(71) Applicant: Emberion Oy, Espoo (FI)

(72) Inventor: Alan Colli, Cambridge (GB)

(73) Assignee: Emberion Oy, Helsinki (FI)

(*) Notice: Subject to any disclaimer, the term of this patent is extended or adjusted under 35 U.S.C. 154(b) by 0 days.

(21) Appl. No.: 14/906,251

(22) PCT Filed: Jul. 16, 2014

(86) PCT No.: PCT/FI2014/050580
§ 371 (c)(1),
(2) Date: Jan. 19, 2016

(87) PCT Pub. No.: WO2015/011338
PCT Pub. Date: Jan. 29, 2015

(65) Prior Publication Data
US 2016/0161340 A1    Jun. 9, 2016

(30) Foreign Application Priority Data

Jul. 22, 2013    (GB) .................................. 1313030.7

(51) Int. Cl.
G01J 5/00    (2006.01)
G01J 5/08    (2006.01)
G01J 5/04    (2006.01)
G01J 5/34    (2006.01)

(52) U.S. Cl.
CPC ............. *G01J 5/0837* (2013.01); *G01J 5/046* (2013.01); *G01J 5/34* (2013.01); *G01J 2005/0077* (2013.01)

(58) Field of Classification Search
CPC ............ H01L 31/09; G01J 5/0853; G01J 5/34
See application file for complete search history.

(56) References Cited

U.S. PATENT DOCUMENTS

| | | |
|---|---|---|
| 5,235,195 A | 8/1993 | Tran et al. |
| 5,530,247 A | 6/1996 | McIver et al. |
| 7,095,027 B1 | 8/2006 | Boreman et al. |
| 7,683,323 B2 * | 3/2010 | Kymissis .................. G01J 5/34 250/338.3 |
| 2008/0283751 A1 | 11/2008 | Kymissis |

OTHER PUBLICATIONS

Ishi et al., "Si Nano-photodiode with a surface plasmon antenna," 2005, Japanese Journal of Applied Physics, vol. 44, No. 12, pp. L364-L366.*
International Search Report and Written Opinion received for corresponding Patent Cooperation Treaty Application No. PCT/FI2014/050580, dated Nov. 7, 2014, 11 pages.
(Continued)

*Primary Examiner* — Kiho Kim
(74) *Attorney, Agent, or Firm* — Harrington & Smith

(57) ABSTRACT

An apparatus comprising: a sensor (1) configured to sense electromagnetic radiation (15) wherein the sensor (1) comprises a sensing portion (3) comprising a pyroelectric material (4) configured to be responsive to incident electromagnetic radiation (15) and a transducing portion (7) configured to convert the response of the pyroelectric material (4) into an output signal; and at least one antenna (21) configured to direct the electromagnetic radiation (15) onto the sensor (1).

13 Claims, 2 Drawing Sheets

(56) References Cited

OTHER PUBLICATIONS

Figure 1:
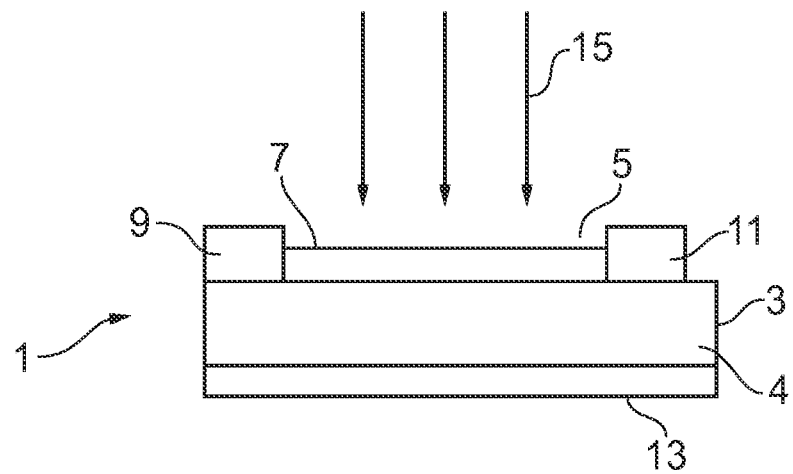

Hsieh Chun-Yi et al. "Graphene-lead zirconate titanate optothermal field effect transistors" Allied Physics letters, Nr. 11, vol. 100, pp. 113507-113507-4. (Dec. 3, 2012).
Search Report received for corresponding GB Application No. 1313030.7, dated Oct. 23, 2013, 3 pages.
S. Wentworth et al. "Antenna-coupled thermal detectors of mm-wave radiation", Micrwae Journal, 1993, vol. 1, pp. 94-103.

\* cited by examiner

APPARATUS FOR SENSING

RELATED APPLICATION

This application was originally filed as PCT Application No. PCT/FI2014/050580 filed Jul. 16, 2014, which claims priority benefit from GB Patent Application No. 1313030.7, filed Jul. 22 2013.

TECHNOLOGICAL FIELD

Examples of the disclosure relate to an apparatus for sensing. In particular, they relate to an apparatus for sensing electromagnetic radiation. The electromagnetic radiation may be in the infrared region of the spectrum.

BACKGROUND

Pyroelectric detectors which convert electromagnetic radiation into an electric output signal are known. Such detectors may be used in thermal imaging devices. The detectors may be configured to detect radiation in the infrared region of the spectrum. However, such detectors may have limitations.

For example, one type of pyroelectric detector may comprise a pyroelectric material positioned between two electrodes. If the pyroelectric material is an insulator then a capacitor is formed. Electromagnetic radiation which is incident on the detector may cause an increase in the temperature of the pyroelectric material which will affect the charge distribution within the pyroelectric material. This affects the charges stored on each of the plates of the capacitor and causes an electric pulse to be provided between the two electrodes.

These types of detectors can only be used to detect changes in temperature. The electric pulse is only provided when there is a change in the charge distribution in the pyroelectric material. Therefore in order to be used to detect incident electromagnetic radiation the incoming radiation must be chopped in order to enable a continuous signal output signal to be provided.

Also the temperature increase of the pyroelectric material caused by the incident electromagnetic radiation may be very small. In some examples the temperature increase may be in the region of 0.01 to 0.1° C. This may only create a weak output signal which may then require amplification.

The output signal which is provided by the capacitive detectors is dependent upon the surface area of the detector. Therefore decreasing the size of the detectors decreases the responsiveness of the detector. This makes it difficult to decrease the size of the detectors and makes it difficult to integrate the detectors into other devices.

Also the capacitive detectors do not distinguish between different wavelengths of radiation. The capacitive detectors can provide an output signal which may be dependent upon the intensity of the electromagnetic radiation signal but which provides no information regarding the wavelengths of the radiation within the electromagnetic radiation signal.

It would be useful to provide an apparatus for sensing which overcomes these deficiencies.

BRIEF SUMMARY

According to various, but not necessarily all, examples of the disclosure there may be provided an apparatus comprising: a sensor configured to sense electromagnetic radiation wherein the sensor comprises a sensing portion comprising a pyroelectric material configured to be responsive to incident electromagnetic radiation and a transducing portion configured to convert the response of the pyroelectric material into an output signal; and at least one antenna configured to direct the electromagnetic radiation onto the sensor.

In some examples the transducing portion may comprise graphene.

In some examples the transducing portion may be positioned in proximity to the pyroelectric material so that changes in charge distribution within the pyroelectric material affect the output signal provided by the transducing portion.

In some examples the transducing portion may be positioned overlaying the sensing portion.

In some examples the transducing portion may extend between a source contact and a drain contact. In some examples at least one antenna may be coupled to at least one of the contacts.

In some examples the at least one antenna may comprise a plasmonic antenna.

In some examples the at least one antenna may be configured to concentrate energy from the electromagnetic radiation onto the sensor to amplify an effect of the incident electromagnetic radiation on the sensor.

In some examples the at least one antenna may be configured to amplify a heating effect of the incident radiation on the pyroelectric material.

In some examples a plurality of antennas may be provided for the sensor. In some examples the plurality of antennas may have different resonant wavelengths.

In some examples at least one antenna may be configured have a resonant wavelength in the infrared region of the electromagnetic spectrum.

In some examples there may be provided a device comprising a plurality of apparatus as described above. In some examples different apparatus may comprise antennas configured to have different resonant wavelengths.

In some examples there may be provided a thermal imaging device comprising a plurality of apparatus as described above.

The apparatus may be for sensing. The apparatus may be for sensing electromagnetic radiation. In some examples the apparatus may be configured to sense electromagnetic radiation in the infrared region of the electromagnetic spectrum. This may enable the apparatus to be used in devices such as thermal imaging devices or other heat sensors.

BRIEF DESCRIPTION

Figure 2:
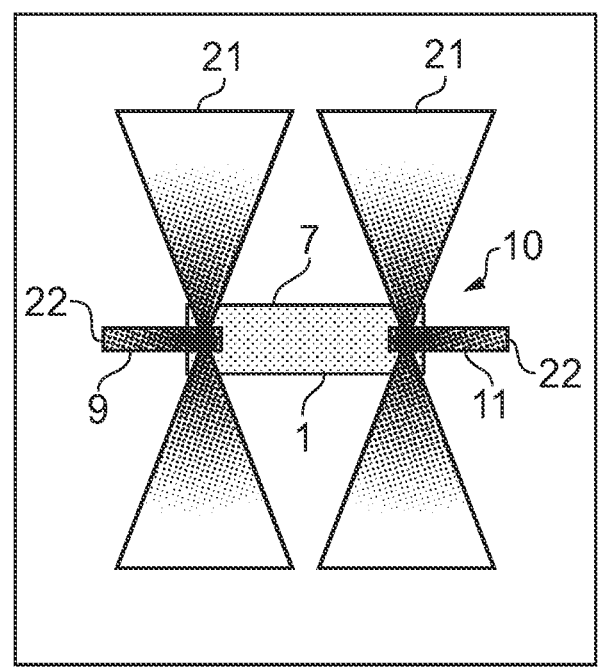
Figure 3:
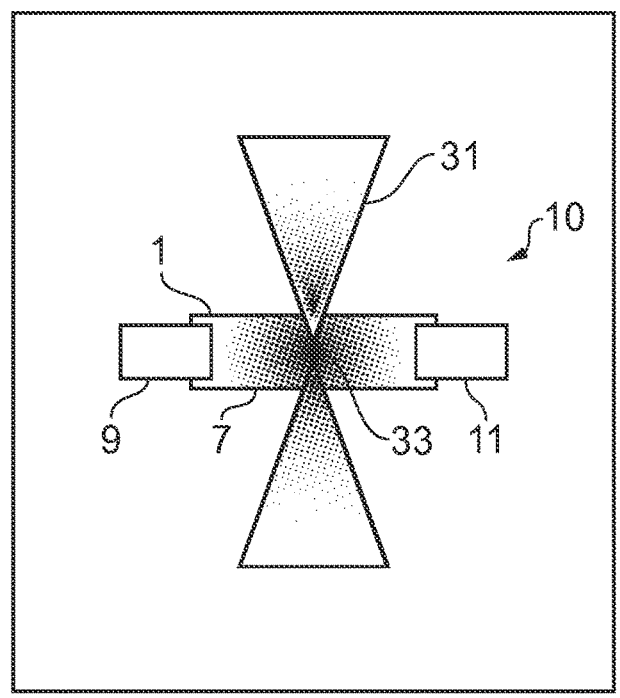
Figure 4:
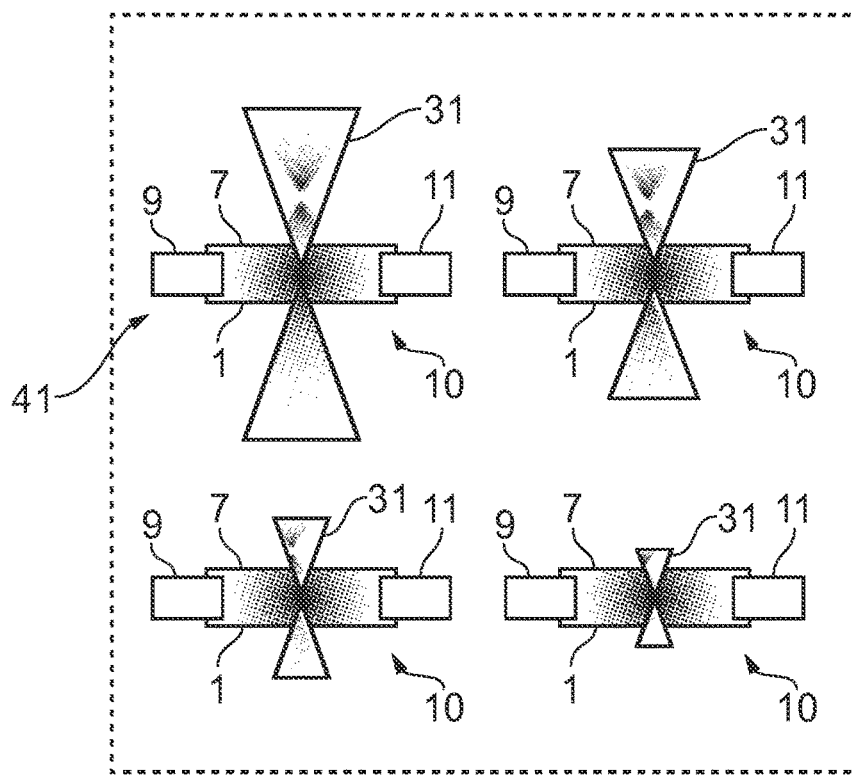

For a better understanding of various examples that are useful for understanding the detailed description, reference will now be made by way of example only to the accompanying drawings in which:

FIG. 1 illustrates a sensor;
FIG. 2 illustrates an apparatus;
FIG. 3 illustrates an apparatus; and
FIG. 4 illustrates a device comprising a plurality of apparatus.

DETAILED DESCRIPTION

The Figures illustrate an apparatus 10 comprising: a sensor 1 configured to sense electromagnetic radiation 15 wherein the sensor 1 comprises a sensing portion 3 comprising a pyroelectric material 4 configured to be responsive to incident electromagnetic radiation 15 and a transducing portion 5 configured to convert the response of the pyroelectric material 4 into an output signal; and at least one antenna 21, 31 configured to direct the electromagnetic radiation 15 onto the sensor FIG. 1 illustrates a sensor 1 according to examples of the disclosure. The sensor 1 comprises a sensing portion 3 and a transducing portion 5.

Electromagnetic radiation 15 may be incident upon the sensor 1. The electromagnetic radiation may comprise radiation in the infrared region of the spectrum. For example, the electromagnetic radiation may comprise radiation with wavelengths between 5-14 μm. The infrared radiation may provide an indication of the temperature of the source of the infrared radiation.

In some examples the electromagnetic radiation 15 may also comprise radiation outside the infrared region of the spectrum. For example the incident electromagnetic radiation may also comprise radiation in the visible region of the spectrum.

The sensing portion 3 of the sensor 1 may comprise any means which may be configured to be responsive to incident electromagnetic radiation 15. In the example of FIG. 1 the sensing portion 3 comprises a pyroelectric material 4. The pyroelectric material 4 may be configured so that that incident radiation will cause polarisation of the lattice structure within the pyroelectric material 4. This causes a change in the charge distribution within the pyroelectric material 4 and so causes a change in the local electric field around the pyroelectric material 4.

The pyroelectric material 4 may comprise any suitable material which provides a change in charge distribution in response to incident electromagnetic radiation. Examples of suitable materials include Lead Zirconate Titanate (PZT), Lithium Tantalate (LiTaO$_3$), Lithium Niobate (LiNbO$_3$), Strontium Barium Niobate (SrBaNb$_2$O$_6$), Gallium Nitride (GaN), Caesium Nitrate (CsNO$_3$), polymers such as polyvinyl fluoride or any other material.

The transducing portion 5 may comprise any means which may be configured to convert the response of the sensing portion 3 into an output signal. In the example of FIG. 1 the transducing portion 5 is configured to convert the local electrical field created by the pyroelectric field into an electrical output signal.

In the example of FIG. 1 the transducing portion 5 comprises a layer of graphene 7. The graphene 7 may be very thin and so can be positioned very close to the pyroelectric material 4 of the sensing portion 3. In the example of FIG. 1 the graphene 7 is provided overlaying the pyroelectric material 4. This may make the graphene 7 very responsive to the changes in the local electrical field of the pyroelectric material 4.

In the example of FIG. 1 the graphene 7 extends between a source contact 9 and a drain contact 11. This may create a channel for current to be provided through the graphene 7. The current through the channel may be dependent on the local electric field of the pyroelectric material 4.

In the example of FIG. 1 a layer of graphene 7 is used in the transducing portion 5. In other examples different materials may be used. The materials used in the transducing portion 5 may be any material which may be manufactured in a thin film and positioned overlaying a pyroelectric material 4 and which has a conductivity which is dependent upon the local electric field. In some examples the transducive material may also be deformable and/or transparent.

In the example of FIG. 1 the sensor 1 also comprises a substrate 13. The pyroelectric material 4 may be positioned on the substrate 13.

The substrate 13 may comprise any suitable material. In some examples the substrate 13 may comprise a material, such as aluminum or copper, which is good at absorbing electromagnetic radiation. The substrate 13 may heat up in response to incident electromagnetic radiation. Once the substrate 13 has increased in temperature this may cause an increase in temperature of the pyroelectric material 4.

The incident electromagnetic radiation 15 may cause a change in temperature of the sensor 1. The change in temperature of the sensor 1 may cause a change in the charge distribution within the pyroelectric material 4 which causes a change in the local electric field. The local electric field affects the amount of current in the graphene 7 channel which therefore provides an output signal representative of the incident electromagnetic radiation 15.

The graphene 7 may be transparent to the incident electromagnetic radiation 15 so that the incident electromagnetic radiation 15 has no direct effect on graphene 7. In some examples the pyroelectric material 4 may be a poor absorber of electromagnetic radiation and/or a poor thermal conductor. This may result in only a small change in temperature of the pyroelectric material 4 for a given amount of incident electromagnetic radiation.

The magnitude of the change in temperature of the pyroelectric material 4 may be increased by coupling one or more antennas 21, 31 to the sensor 1 as described below in relation to FIGS. 2 and 3.

FIG. 2 illustrates an apparatus 10 according to an example of the disclosure. The apparatus 10 comprises a sensor 1 and at least one antenna 21.

The sensor 1 may be as described above in relation to FIG. 1. In FIG. 2 the sensor is illustrated in plan view so only the graphene 7 and the contacts 9, 11 are shown. The sensing portion 3 would be positioned underneath the graphene 7.

In the example of FIG. 2 the contacts 9, 11 are formed into antennas 21. In the example of FIG. 2 both the source and drain contacts 9, 11 are formed into antennas 21. In other examples only one of the contacts 9, 11 may be formed into an antenna 21.

The antenna 21 may comprise any means which is configured to concentrate the heating caused by the incident electromagnetic radiation 15 onto the sensor 1.

The antennas 21 may have any suitable size and/or shape. In the example of FIG. 2 the antennas 21 have a bow tie geometry. The antennas 21 comprise two triangles. In the example of FIG. 2 the triangles are isosceles triangles and the apex of the first triangle is joined to the apex of the second triangle. The antennas 21 may also comprise an appendix 22 which may be configured to connect the antenna 21 to an external circuit. In the example of FIG. 2 the appendix 22 is rectangular. In some examples the appendix 22 may lie on the graphene 7 to improve contact resistance to the graphene channel.

The antennas 21 may be galvanically connected to the graphene 7. This may enable a direct current to flow between the antennas 21 and the graphene 7 and may enable the antennas to act as the contacts 9, 11.

When electromagnetic radiation 15 is incident on the antennas 21 the antennas 21 may absorb the electromagnetic radiation 15. This may cause an increase in temperature of the antennas 21.

The shading of the antennas 21 in the FIG. 2 provides an indication of the temperature of the antenna 21 in response to incident electromagnetic radiation 15. The darker regions indicate the regions with a higher temperature. It can be seen in FIG. 2 that the heating of the antenna 21 is distributed across most of the antenna 21.

As the antennas 21 act as the contacts 9, 11 they may be in direct contact with the pyroelectric material 4 as illustrated in FIG. 1. This may enable heat to be transferred from the antennas 21 to the pyroelectric material 4. As the antenna 21 may concentrate the effect of the incident electromagnetic radiation this may cause a larger change in temperature than would be achieved without the antenna 21. The larger change in temperature of the contacts may provide for a larger change in the temperature of the pyroelectric material 4 which may provide a larger response of the graphene 7.

The size and shape of the antennas 21 may be chosen such that the heating is more efficient for particular wavelengths of incident electromagnetic radiation 15. For example the antennas 21 may be selected to have a resonant wavelength in the infrared region of the spectrum.

In the particular example of FIG. 2 both of the antennas 21 have the same size and shape. In other examples the antennas 21 may have different sizes and/or shapes. This may enable them to be responsive to different wavelengths of incident electromagnetic radiation 15.

The material selected for use as the antenna 21 may comprise a high loss material. This may cause a larger amount of heating for a given amount of incident radiation.

FIG. 3 illustrates another apparatus 10 according to an example of the disclosure. The apparatus 10 of FIG. 3 also comprises a sensor 1 and at least one antenna 31. In the example of FIG. 3 the antenna 31 is a plasmonic antenna 31. The sensor 1 may be as described above in relation to FIG. 1. In FIG. 3 the sensor is illustrated in plan view so only the graphene 7 and the contacts 9, 11 are shown. The sensing portion 3 would be positioned underneath the graphene 7.

In FIG. 3 only one plasmonic antenna 31 is provided. It is to be appreciated that more than one plasmonic antenna 31 may be provided in other examples.

The plasmonic antenna 31 is provided separate to the contacts 9, 11. The plasmonic antenna 31 may be provided so that there is no direct metallic short between the contacts 9, 11 and the plasmonic antenna 31 other than the graphene channel itself.

In the example of FIG. 3 the plasmonic antenna 31 is provided in the middle of the graphene 7 channel between the two contacts 9, 11. It is to be understood that, in other examples, the plasmonic antenna 31 could be positioned at any point along the graphene 7 channel.

The plasmonic antennas 31 may be configured to enable the electromagnetic field of the incident electromagnetic radiation 15 to be concentrated into a gap 33. The gap 33 may be a small gap. The gap 33 may be smaller than the resonant wavelength of the antenna 31. For example, the gap 33 may be in the region of 50-200 nm.

The plasmonic antennas 31 may have any suitable size and/or shape so as to enable the electromagnetic field of the incident electromagnetic radiation 15 to be concentrated into the gap 33. In the example of FIG. 3 the antenna 31 has a bow tie geometry. The antenna 31 comprises two triangles separated by a small gap 33.

In the example of FIG. 3 the triangles are isosceles triangles and the apex of the first triangle is positioned close to the apex of the second triangle. The gap 33 is provided between the two apex.

The shading of the antenna 31 in FIG. 3 provides an indication of the heating of the antenna 31 in response to incident electromagnetic radiation 15. The darker regions indicate the regions with a higher temperature. It can be seen in FIG. 3 that the heating of the antenna 31 is localised in the apex of the triangles and in the small gap 33 between the two apex.

The increase in temperature in the gap 33 may cause an increase in the temperature of the graphene 7 directly underneath the gap 33. This may, in turn cause an increase in temperature of the pyroelectric material 4 directly underneath the graphene 7. As the heating effect is localised in a small area this may lead to a relatively large increase in temperature for that area. The increase in temperature may be large compared to the increase in temperature which would occur if same amount of electromagnetic radiation was directly incident on the sensor 1.

The size and shape of the plasmonic antenna 31 may be chosen such that the heating is more efficient for particular wavelengths of incident electromagnetic radiation 15. For example the plasmonic antenna 31 may be selected to have a resonant wavelength in the infrared region of the spectrum.

In some examples the plasmonic antennas 31 may be coupled to one or more plasmonic lenses. The plasmonic lenses collect the incident electromagnetic radiation from a large surface are. The effective surface area of the lens may be large compared to the surface are of the sensor 1. The collected radiation can then be focused onto the plasmonic antenna 31. The plasmonic lenses may comprise one or more metal discs.

In the examples of FIGS. 2 and 3 the antennas 21, 31 have a bow tie geometry. Other shaped antennas 21, 31 may be used in other examples of the disclosure.

For example, the antennas 21, 31 may comprise two rectangles separated by a small gap or two discs or ellipses separated by a small gap.

The shape of the antenna 21, 31 which is chosen may depend on a number of factors. One such factor may be the wavelength of the electromagnetic radiation which the antenna 21, 31 is intended to be responsive to. If the antenna 21, 31 is chosen to be responsive to infrared radiation then the antenna 21, 31 may be a bow tie antenna 21, 31 or two rectangles. Such antenna 21, 31 may need to be responsive to an electromagnetic radiation having a wavelength in the range of micrometres. In other examples the antennas 21, 31 may be chosen to be responsive to visible light. In such examples the antenna 21, 31 may need to be responsive to radiation with a wavelength in the range of nanometeres and it may be difficult to manufacture an antenna 21, 31 having an intricate shape such as a bow tie at the desired resolution. Therefore for wavelengths in the visible region of the spectrum the antenna 21, 31 may be disc or circle or ellipse.

The apparatus 10 described above provides an apparatus 10 which may be used for sensing electromagnetic radiation including electromagnetic radiation in the infrared region of the spectrum.

The antennas 21, 31 may be configured to focus the incident electromagnetic radiation to create localised heating of the sensing portion 3. This amplifies the effect of the incident electromagnetic radiation 15. This increases the sensitivity of the apparatus 10 as it gives a larger output signal for the same amount of incident electromagnetic radiation. This may allow for a measurable response to be provided even for low levels of incident radiation.

Furthermore the antennas 21, 31 may be configured to resonate at a particular wavelength. This may enable the apparatus 10 to be used to detect a particular wavelength of incident electromagnetic radiation 15. If the antenna 21, 31 is optimised for a particular wavelength of incident electromagnetic radiation 15 it will not be very responsive for other wavelengths of radiation. This may mean that the antenna 21, 31 does not heat up as much for other wavelengths. This acts as a filter for ambient electromagnetic radiation. This may enable the apparatus 10 to be used as a thermal imaging sensor even during daylight or when there is visible light incident on the apparatus 10 because the antennas 21, 31 may be configured so that the visible light would not cause sufficient heating of the antennas 21, 31 and the pyroelectric material 4 to be detected. This would effectively filter out the unwanted wavelengths.

Unlike capacitive sensors, the response of the sensor 1 in the apparatus described above is not dependent on the size of the sensor 1. The antennas, 21, 31 amplify the heating effect of the incident radiation which may enable the size of the sensors 1 to be reduced without decreasing the sensitivity of the apparatus 10.

The apparatus 10 also provides a steady state response. Unlike capacitive sensors which only detect a change in the temperature the apparatus 10 provides a measure of the local electric field of the pyroelectric material 4. As the local electric field is proportional to the temperature the conductivity of the graphene is also proportional to the temperature. This enables the graphene 7 to provide a measure of the actual temperature rather than a change in the temperature. Therefore there is no need to chop the incoming signal which may allow for a larger amplitude and/or signal to noise ratio of the output signal.

FIG. 4 illustrates a device 41. The device 41 may be used as a thermal imaging device or a heat sensor.

The device 41 may comprise a plurality of apparatus 10 as described above. In the particular example of FIG. 4 the device comprises a plurality of apparatus 10 with plasmonic antennas 31 as described above in relation to FIG. 3. It is to be appreciated that in other examples the device 41 could also comprise a plurality of apparatus 10 with antennas 21 as described above in relation to FIG. 2. In some examples the device 41 may comprise apparatus 1 with normal antennas 21 and apparatus 1 with plasmonic antennas 31.

In the particular example of FIG. 4 four apparatus 10 are provided within the device 41. It is to be appreciated that any number of apparatus 10 may be provided in other examples of the disclosure.

In the device 41 each of the four apparatus 10 has an antenna 31 which is configured to have a different resonant wavelength to each of the other antennas 31. Each of the antennas 31 may be a different size 31 so that they have a different resonant wavelength. In other examples the antennas may have different shapes so that they are responsive to different wavelengths.

The device 41 therefore comprises a plurality of apparatus 10 where each apparatus 10 is configured to be responsive to a different wavelength of incident electromagnetic radiation 15. This enables the device 41 to measure different wavelengths or bandwidths of wavelengths of incident radiation. The device 41 is chromatic in that it is wavelength selective.

This may enable more detailed information to be obtained by the device. This may enable spectral information to be obtained from the incident electromagnetic radiation 15 which may enable a more accurate interpretation of the electromagnetic radiation to be obtained. The device 41 may enable more accurate measurements of incident electromagnetic radiation 15 to be made.

In some examples the device 41 may comprise some apparatus 10 which are configured to detect incident electromagnetic radiation 15 in the infrared region of the spectrum and some which are configured to detect incident electromagnetic radiation 15 in the visible region of the spectrum. This may enable the heating effect of the infra red radiation to be measured separately to the heating effect of the radiation in the visible region of the spectrum. This may enable the device 41 to be used as a thermal sensor even in daylight or when there a high levels of incident electromagnetic radiation 15 in the visible region of the spectrum.

In the above description the term coupled means operationally coupled and any number or combination of intervening elements can exist including no intervening elements.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class.

Although embodiments of the present invention have been described in the preceding paragraphs with reference to various examples, it should be appreciated that modifications to the examples given can be made without departing from the scope of the invention as claimed. For example the apparatus 10 described may be used for infrared radiation however it is to be appreciated that the apparatus 10 could also be used, in other examples for other frequencies of radiation.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus comprising: a sensor configured to sense electromagnetic radiation wherein the sensor comprises a sensing portion comprising a pyroelectric material configured to be responsive to incident electromagnetic radiation and a transducing portion configured to convert the response of the pyroelectric material into an output signal; and at least one antenna configured to direct the incident electromagnetic radiation onto the sensor, wherein a plurality of antennas are provided for the sensor and the plurality of antennas have different resonant wavelengths.

2. An apparatus as claimed in claim 1 wherein the transducing portion comprises graphene.

3. An apparatus as claimed in claim 1 wherein the transducing portion is positioned in proximity to the pyroelectric material so that changes in charge distribution within the pyroelectric material affect the output signal provided by the transducing portion.

4. An apparatus as claimed in claim 1 wherein the transducing portion is positioned overlaying the sensing portion.

5. An apparatus as claimed as claimed in claim 1 wherein the transducing portion extends between a source contact and a drain contact.

6. An apparatus as claimed in claim 5 wherein at least one antenna is coupled to at least one of the contacts.

7. An apparatus as claimed in claim 1 wherein the at least one antenna comprises a plasmonic antenna.

8. An apparatus as claimed in claim 1 wherein the at least one antenna is configured to concentrate energy from the electromagnetic radiation onto the sensor to amplify an effect of the incident electromagnetic radiation on the sensor.

9. An apparatus as claimed in claim 8 wherein the at least one antenna is configured to amplify a heating effect of the incident electromagnetic radiation on the pyroelectric material.

10. An apparatus as claimed in claim 1 wherein at least one antenna is configured have a resonant wavelength in the infrared region of the electromagnetic spectrum.

11. A device comprising a plurality of apparatus, each apparatus comprising: a sensor configured to sense electromagnetic radiation wherein the sensor comprises a sensing portion comprising a pyroelectric material configured to be responsive to incident electromagnetic radiation and a transducing portion configured to convert the response of the pyroelectric material into an output signal; and at least one antenna configured to direct the incident electromagnetic radiation onto the sensor, wherein a plurality of antennas are provided for the sensor and different apparatus comprise antennas configured to have different resonant wavelengths.

12. The device of claim 11, wherein the device comprises a thermal imaging device comprising the plurality of apparatus.

13. An apparatus comprising: a sensor configured to sense electromagnetic radiation wherein the sensor comprises a sensing portion comprising a pyroelectric material configured to be responsive to incident electromagnetic radiation and a transducing portion configured to convert the response of the pyroelectric material into an output signal; and at least one antenna configured to direct the incident electromagnetic radiation onto the sensor, wherein the at least one antenna comprises a plasmonic antenna.

\* \* \* \* \*